W. JOHNSON.
WHEEL TIRE.
No. 760.   Patented May 30, 1838.
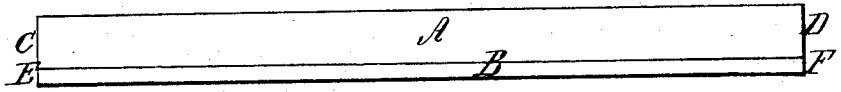
CEFD is a bar of Tire with a steel plate EBF welded upon the iron CAD.
Witnesses;
William P. Gibbons
Rich'd W. Robinson
Inventor,
Wm Johnson

UNITED STATES PATENT OFFICE.

WM. JOHNSON, OF NEWARK, DELAWARE.

FACING IRON WITH STEEL FOR SLEIGH-RUNNERS AND TIRES FOR WHEELS.

Specification of Letters Patent No. 760, dated May 30, 1838.

*To all whom it may concern:*

Be it known that I, WILLIAM JOHNSON, of the village of Newark, county of Newcastle, and State of Delaware, have invented a new and useful Improvement in the Composition and Manufacture of the Sleigh and Sled Shoes, which improvement is also applicable to the tire of wheels generally; and I do hereby declare that the following is a true and exact description of my said improvement.

The nature of my improvement consists in having the exterior surface of the shoe or tire laid with steel about an eighth of an inch thick; to be hardened at the time of putting the shoe or tire on the sleigh, sled or wheel.

The following are the advantages of this improvement: When the above described shoe is applied to a sleigh or sled, it will be much more durable than the ordinary materials used for this purpose; and when coming in contact with the ground or stones the friction between the two bodies is so materially decreased as to permit the shoe to slide over the ground or stones without injury to the sleigh, and with but little extra exertion from the horse. Its increased durability in tires is evident.

What I claim as my invention and desire to secure by Letters Patent, is—

The application of the steel to the outer surface of the shoe or tire, by whatever process it is manufactured.

WM. JOHNSON.

Witnesses:
WILLIAM P. GIBBONS,
RICHD. W. ROBINSON.